(12) United States Patent
Lyew et al.

(10) Patent No.: US 7,368,278 B2
(45) Date of Patent: May 6, 2008

(54) **PROCESS FOR TREATING AN EFFLUENT POLLUTED BY MTBE OR TAME USING THE *MYCOBACTERIUM AUSTROAFRICANUM* I-2562 STRAIN FIXED ON A MINERAL SUPPORT COMPRISING PERLITE**

(75) Inventors: Darwin Lyew, Montreal (CA); Francoise Fayolle, Clamart (FR); Serge Guiot, Montreal (CA); Frederic Monot, Nanterre (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 433 days.

(21) Appl. No.: 10/858,479

(22) Filed: Jun. 2, 2004

(65) Prior Publication Data
US 2005/0019895 A1   Jan. 27, 2005

(30) Foreign Application Priority Data
Jun. 20, 2003   (FR)   ................... 03/06.647

(51) Int. Cl.
*C12S 1/00*   (2006.01)
(52) U.S. Cl. .................................. 435/262.5
(58) Field of Classification Search ............. 435/262.5
See application file for complete search history.

(56) References Cited

U.S. PATENT DOCUMENTS 5,518,910 A    5/1996   Parker et al.
5,874,001 A *  2/1999   Carter ..................... 210/610

2003/0073225 A1   4/2003   Fayolle et al.

FOREIGN PATENT DOCUMENTS

EP          0692319 A      1/1996
EP          1302447 A      4/2003
WO          WO 9410095 A   5/1994

OTHER PUBLICATIONS

Miller et al. Full Scale In-Situ Bio-barrier Demonstration for Containment and Treatment of MTBE, Remediation, Winter 2001, pp. 25-36.*
Piveteau, P. et al. Biodegradation of t-Butyl Alcohol and Related Xenobiotics by a Methylotrophic Bacterial Isolate. Applied Microbiology and Biotechnology, vol. 55, 369-373, 2001.*
Stocking, A.J. et al. Bioremediation of MTBE: a Review from a Practical Perspective. Biodegradation, vol. 11, pp. 187-201, 2000.*
Francois et al.: "Biodegradation of Methyl tert-Butyl Ether and other Fuel Oxygenates by a new strain, *Mycobacterium austroafricanum* IFP 2012," Applied and Environmental Microbiology, vol. 68, No. 6, Jun. 2002, p. 2754-2762.
Steffan et al.: "Biodegradation of the gasoline oxygenates methyl tert-butyl ether, ethyl tert-butyl ether, and tert-amyl methyl ether by propane-oxidizing bacteria," Applied and Environmental Microbiology, vol. 63, No. 11, Nov. 1997, p. 4216-4222.

* cited by examiner

*Primary Examiner*—Jon Weber
*Assistant Examiner*—Kailash C Srivastava
(74) *Attorney, Agent, or Firm*—Millen, White, Zelano & Branigan, P.C.

(57) ABSTRACT

To reduce the concentration of methyl tert-butyl ether (MTBE) or tert-amyl methyl ether (TAME) in an aquifer polluted by these ethers, a new mineral support for fixing bacteria, and in particular *Mycobacterium austroafricanum* I-2562, said mineral support comprising perlite, is used in a biobarrier- or biofilter-type process.

20 Claims, No Drawings

PROCESS FOR TREATING AN EFFLUENT POLLUTED BY MTBE OR TAME USING THE *MYCOBACTERIUM AUSTROAFRICANUM* I-2562 STRAIN FIXED ON A MINERAL SUPPORT COMPRISING PERLITE

BACKGROUND OF THE INVENTION

1. Field of the Invention

The invention relates to the treatment by a biobarrier- or biofilter-type process of an effluent polluted by MTBE or TAME, using bacteria capable of degrading methyl tert-butyl ether or tert-amyl methyl ether.

It relates more particularly to the use in such a process of a new type of support which serves to fix the bacteria. It applies particularly to the industry for the treatment of water and of water-bearing soils and grounds.

2. Description of the Prior Art

It is known that methyl tert-butyl ether (hereafter called MTBE) or tert-amyl methyl ether (hereafter called TAME) are ethers that can be used as oxygenated additives in unleaded gasolines with the aim of increasing their octane rating. The increasing use of additives such as MTBE or TAME results in large volumes being stored and transported, in particular mixed in gasolines. Due to the relatively high frequency of leaks recorded in underground gasoline stores (service stations in particular), the soluble compounds of the gasolines then dissolve in the aquifers on contact. This is the case in particular with MTBE, which is very soluble in water ($40$ g.$L^{-1}$) but also TAME. The presence, in particular of MTBE, in underground water collection wells manifests itself for the consumer in a disagreeable smell that is perceptible even at low concentration. Moreover, the mobility of these compounds means that the pollution "trails" are very broad. These two points, together with the public-health problem posed by the possible effects of the ingestion by the consumer of water polluted by MTBE or TAME at low concentration over extended periods means that the implementation of the clean-up processes is envisaged.

It is in this particular case because of the physico-chemical properties of these compounds that physico-chemical clean-up processes prove pretty ineffective and processes using aerobic microorganisms with particular capacities for degrading MTBE or TAME are envisaged. Such microorganisms are rare and their rates of growth on MTBE, in particular, are slow. It is therefore particularly useful to define a way of using these microorganisms which optimizes their particular capacities. Recent literature shows that the biobarrier is where the use of the pollutant as a source of carbon and energy through the microflora used constitutes a clear advantage, and this technique is wholly suitable for effectively introducing the selected microflora into the aquifer to be decontaminated. In this case, a trench is dug at the base of the aquifer polluted by the MTBE or TAME, then a support, in general of mineral type, is put in place and the aerobic microorganisms of interest (degraders of MTBE and/or TAME) are fixed on said support to clean up the aquifer during its natural or forced flow through the biobarrier. More precisely, the bacterium can be developed on a biofilter or biobarrier system of suitable volume, the effluents containing said ethers are introduced in the presence of air or oxygen into the biofilter or into the biobarrier at an MTBE flow rate of less than 30 mg.$L^{-1}$.$h^{-1}$ and the effluent contains a small concentration of said ethers.

For example, Steffan et al. [2001] successfully used the selected ENV425 strain by bioaugmentation in contaminated aquifers in conditions (injection of air to which propane had been added) allowing the strain to degrade the MTBE in situ by cometabolism. Similarly, Salanitro [2000] used an improved culture of the BC-1 consortium to carry out a pilot-scale operation for rehabilitation of a sheet of water polluted by MTBE. The treatment used a biobarrier 6 m long supplied with oxygen. The support was composed of the sand of the formation, which was of an average granulometry. After 261 days, the concentration of MTBE had fallen from 2-9 mg $L^{-1}$ to a value below 10 μg $L^{-1}$ in the zone that had benefited from bioaugmentation. The concentration of TBA was also below 10 μg $L^{-1}$. An effective, but clearly slower, decrease in the concentration of MTBE was observed in the control zone stimulated only by added oxygen.

There is described in French patent application FR-A-2 830 854 the isolation of a bacterium, *Mycobacterium* sp. I-2562, hereafter identified as *Mycobacterium austroafricanum* I-2562 or *M. austroafricanum* I-2562, capable of thriving on MTBE or TAME as sole source of carbon and energy leading to a complete degradation of the MTBE and its degradation intermediates, tert-butyl formate or TBF and tert-butyl alcohol or TBA, into carbon dioxide and water and also to the production of biomass or even to a complete degradation of the TAME and its degradation intermediates, tert-amyl formate or TAF and tert-amyl alcohol or TAA, into carbon dioxide and water and also to the production of biomass. The addition of yeast extract during the growth on MTBE, in particular, had a positive effect on growth, improving the rate of degradation of the MTBE although the yeast extract alone did not constitute a growth substrate for the strain.

SUMMARY OF THE INVENTION

One of the aims of the invention is to describe new potentials of a mineral support, not yet used for this purpose, for the fixing of a useful bacterium in order to use the support-bacteria complex in a biobarrier-type implementation to clean up aquifers containing MTBE and/or TAME, or of biofilter type to clean up gases containing these same products.

DETAILED DESCRIPTION OF THE INVENTION

The process of the invention uses an expanded alumino-silicate, usually called perlite, to fix the *M. austroafricanum* I-2562 bacterium in a more advantageous manner than other materials often used, which can be pumice stone, peat, pozzolana or activated charcoal, with the aim of using the resultant perlite—*M. austroafricanum* I-2562 complex in a biobarrier in order to reduce the concentration of MTBE and/or TAME in an aquifer polluted by one or other or both of these compounds.

The process uses a bacterial strain, isolated from the environment, which is capable of completely degrading MTBE and/or TAME without accumulation of degradation intermediate. This bacterium deposited at the Institut Pasteur (CNCM de l'Institut Pasteur, 25, rue du Docteur Roux, F-75724 PARIS CEDEX 15) is *M. austroafricanum* I-2562.

More specifically, the process consists of a treatment of aqueous effluents containing at least one ether: tert butyl ether (MTBE) or tert amyl methyl ether (TAME) in order to reduce the concentration of said ethers, in which an *M. austroafricanum* I-2562 bacterium is grown in aerobic conditions in the presence of one of said ethers and said ether is degraded by said bacterium to the final products of the degradation, carbon dioxide and water, the *M. austroafricanum* I-2562 bacterium being fixed on a support comprising at least 50% by mass of perlite. The mineral support is preferably essentially composed of perlite.

According to a characteristic of the invention, the aqueous effluents can be an aquifer containing MTBE and/or TAME and in which the *M. austroafricanum* I-2562 bacterium is introduced in suitable form in order to reduce the concentration of MTBE and/or TAME in the aquifer.

According to another characteristic, yeast extract can be added to the growth substrate in proportions between 10 and 200 mg.L-1.

In these experiments, it must be noted that MTBE or TAME can be supplied as sole source of carbon but nutritional additives can be added to the growth medium to accelerate the growth on MTBE or on TAME of the bacterium. Thus, a secondary carbon-containing substrate, such as glucose, can be added in continuous, intermittent or cyclical ("pulses") fashion in a small dose such that there is no excess substrate relative to the available dissolved oxygen, bearing in mind that glucose has a theoretical oxygen demand (TOD) of 1.06 mg oxygen.g$^{-1}$ of glucose. This addition allows the *M. austroafricanum* I-2562 bacterium to be stimulated and/or its viability for extended uses to be increased.

The addition of oxygen in biobarrier-type processes can be realized in various ways: it can be provided by addition of air to the aquifer via a piezometer linked to a compressor and implanted directly into the aquifer to be cleaned up. The oxygen can also be provided by injected chemical elements such as oxygenated water which releases one mole of oxygen per two moles of oxygenated water:

It is also possible to use other compounds that decompose on contact with water, thus releasing oxygen ("oxygen release compound" or ORC). There can also be used to this end magnesium peroxide which hydrolyzes, releasing oxygen and producing magnesium:

The seeding of the support can be carried out in two ways: the support, i.e. the perlite, is introduced into the biofilter or the biobarrier and the *M. austroafricanum* I-2562 bacterium is cultured in a reactor on the mineral medium containing for example tert-butyl alcohol or TBA as growth substrate, which allows a substantial biomass to be obtained while inducing the enzyme systems responsible for degrading the MTBE or TAME; then, after growth, the culture obtained is introduced onto the perlite. The perlite and the bacterium can also be introduced simultaneously, and the *M. austroafricanum* I-2562 bacterium then left to develop in the presence of a growth substrate which can be the MTBE or TAME contained in the aquifer or another source of added carbon, so as to fix the bacterium on the support at the same time as its growth.

In the processes thus used, *M. austroafricanum* I-2562 is capable of degrading variable concentrations of MTBE and/or of TAME. Excellent results have been obtained for example with MTBE concentrations in the effluent between 0.05 and 200 mg.L$^{-1}$.

The entire disclosure of all applications, patents and publications, cited above and below, and of corresponding French application 03/06647, filed Jun. 2, 2004, the priority of which is claimed, are hereby incorporated by reference.

The invention will be better understood from the following examples.

EXAMPLE 1

A microorganisms respiration test was used in standard conditions to compare the fixation capacity of *M. austroafricanum* I-2562 on different supports commonly used for this purpose: peat, activated charcoal, pumice stone, pozzolana and perlite.

A preculture of the *M. austroafricanum* I-2562 bacterium is carried out: the *M. austroafricanum* I-2562 strain is seeded on MM saline mineral medium supplemented by tert-butanol or TBA at 1 g.L-1 as source of carbon and energy. The MM medium has the following composition:

| | |
|---|---:|
| KH$_2$PO$_4$ | 1.4 g |
| K$_2$HPO$_4$ | 1.7 g |
| NaNO$_3$ | 1.5 g |
| MgSO$_4$, 7H$_2$O | 0.5 g |
| CaCl$_2$, 2H$_2$O | 0.04 g |
| FeCl$_3$, 6H$_2$O | 0.012 g |
| Concentrated solution of trace elements | 1 mL |
| H$_2$O | q.s.f. 1 liter |

The concentrated solution of trace elements has the following composition for 1 liter distilled water:

| | |
|---|---:|
| CuSO$_4$, 5H$_2$O | 0.1 g |
| MnSO$_4$, 2H$_2$O | 1 g |
| ZnSO$_4$, 7H$_2$O | 1 g |
| AlCl$_3$, 6H$_2$O | 0.4 g |
| NiCl$_2$, 6H$_2$O | 0.25 g |
| H$_3$BO$_3$ | 0.1 g |
| CoCl$_2$, 6H$_2$O | 1 g |
| NaMoO$_4$, 2H$_2$O | 1 g |
| Na$_2$WO$_4$, 2H$_2$O$_2$ | 1 g |

The test proper is carried out in penicillin flasks (160 mL). A fixed volume (50 mL) of each of the supports is introduced into a flask and also a fixed volume (50 mL) of MM mineral medium.

In the case of peat, because of the natural biological activity of this support, a prior treatment process is applied. It consists of three successive sterilizations (120° C. for 20 minutes).

The flasks are then weighed, then sterilized by autoclaving (120° C. for 30 minutes), three times in succession, with a time interval of 24 h between two successive sterilization steps. Any weight loss is evaluated by weighing and the weight of each flask is adjusted to the initial weight by the addition of a suitable volume of sterile MM medium.

The preculture defined above is used to seed each of these flasks in identical manner so as to obtain an initial optical density at 600 nm (O.D. 600 nm) of 0.1, corresponding to a seeding ratio of approximately 10%. The carbon-containing substrate used for a rapid fixation test of the *M. austroafricanum* I-2562 bacterium is tert-butyl alcohol (TBA), an early intermediate of the degradation of MTBE by this bacterium. In fact, M. austroafricanum I-2562 grows rapidly on this carbon-containing substrate. The TBA is added to each flask at a rate of 1 g.L$^{-1}$. The M. austroafricanum I-2562 bacterium is left in contact with the support for 72 hours, accompanied by stirring (100 rpm) at room temperature.

For each of the supports, a control realized in the same conditions and which also contains the carbon-containing substrate, the TBA, but which is not seeded with the M. austroafricanum I-2562 bacterium, is also realized.

After 72 hours, the medium is drained then the whole of the support contained in the flask is washed (30 mL of sterile MM medium), subjected to a Vortex stirring then drained twice in succession; this washing procedure allows the suspended bacteria that are not fixed to the support to be eliminated. The controls of the experiment are also subjected to the same washing treatment. Finally, 50 mL of MM medium is introduced and also TBA at a concentration of 1 g.L$^{-1}$. The flasks are sealed with butyl stoppers and aluminium caps are crimped on, and the quantity of residual oxygen and also the quantity of $CO_2$ produced are measured by gas phase chromatography using samples taken in the gas phase of each of the flasks. These quantities reflect the metabolic activity of the bacteria present in the flask, i.e. those that have remained fixed on the solid support. Thus, the greater the quantity of immobilized cells, the higher these quantities are. The results presented in Table 1 are expressed in mg of oxygen consumed per gram of support per hour (mg $O_2.g^{-1}$ support.h$^{-1}$) and in mg of $CO_2$ produced per gram of support per hour (mg $CO_2.g^{-1}$ support.h$^{-1}$). The results presented in Table 2 are expressed in mg of oxygen consumed per milliliter of support per hour (mg $O_2.mL^{-1}$ support.h$^{-1}$) and in mg of $CO_2$ produced per milliliter of support per hour (mg $CO_2.mL^{-1}$ support.h$^{-1}$).

The results obtained in this comparative test show clearly the advantage of using perlite for fixing M. austroafricanum I-2562 since:

1) it is with this support that the consumption of dioxygen and the production of carbon dioxide linked to the consumption of TBA are greatest, which shows that the fixing of the microorganisms is substantial, and
2) this fixing is effective in a contact time of 72 h between the support and the microorganism showing the rapid colonization capacity of this support by the bacterium.

TABLE 1

Consumption of dioxygen and production of carbon dioxide by *M. austroafricanum* I-2562 in relation to the support and the contact duration

| Support | Particle | Measures carried out after 72 h | | | |
|---|---|---|---|---|---|
| | | Consumption of $O_2$ ($mg \cdot mL^{-1}$ $support \cdot h^{-1}$) | | Production of $CO_2$ ($mg \cdot mL^{-1}$ $support \cdot h^{-1}$) | |
| tested | Size | Control* | Test** | Control* | Test** |
| Peat | ND | ND | ND | ND | ND |
| Activated charcoal | ND | 4.0 ± 1.4 | 9.0 ± 1.4 | 0 | 2.0 ± 0 |
| Pumice stone | 5-10 mm | 0.6 ± 0.4 | 15.5 ± 3.1 | 0 | 6.0 ± 2.0 |
| Pozzolana | 4-6 mm | 0 | 4.5 ± 0.7 | 0 | 2.0 ± 0 |
| Perlite | 2-5 mm | 3.5 ± 3.9 | 92.9 ± 23.9 | 0 | 31.3 ± 4.1 |

TABLE 2

Consumption of dioxygen and production of carbon dioxide by *M. austroafricanum* I-2562 in relation to the support and the contact duration

| Support | Measures carried out after 72 h | | | |
|---|---|---|---|---|
| | Consumption of $O_2$ ($mg \cdot kg^{-1}$ $support \cdot h^{-1}$) | | Production of $CO_2$ ($mg \cdot kg^{-1}$ $support \cdot h^{-1}$) | |
| tested | Control* | Test** | Control* | Test** |
| Peat | ND | ND | ND | ND |
| Activated charcoal | 1.5 ± 0.7 | 3.2 ± 0.4 | 0 | 0.6 ± 0 |
| Pumice stone | 0.2 ± 0.2 | 6.7 ± 1 | 0 | 2.4 ± 0.7 |
| Pozzolana | 0.1 ± 0.1 | 4.0 ± 0.9 | 0 | 1.8 ± 0.2 |
| Perlite | 0.5 ± 0.5 | 11.3 ± 1.5 | 0 | 3.9 ± 0.5 |

EXAMPLE 2

In this example, the perlite is used as a support for the *M. austroafricanum* I-2562 bacterium in a biofilter-type reactor for the treatment of effluent containing MTBE.

The seeding of the perlite is carried out in two stages: one stage of production of the biomass and a stage of fixing the biomass on the perlite.

Production of the biomass: a culture of the *M. austroafricanum* I-2562 bacterium is carried out on 5 L of mineral medium of composition identical to that described in Example 1 with the exception of the nitrogen source which in this case is $(NH_4)_2SO_4$ at 1.2 $g.l^{-1}$ and a supplement of yeast extract (0.05 $g.L^{-1}$). The carbon source is TBA at 1 $g.L^{-1}$. After an incubation of 4 days, the biomass produced (approximately 2.7 g) is harvested by centrifuging and resuspended in 330 mL of the same mineral medium.

Fixing on the perlite: this step is carried out in batches. The biomass harvested above is introduced into a receptacle containing 4 L of perlite in the presence of 2.8 L of mineral medium described above. The carbon source is the TBA at a concentration of 0.6 $g.L^{-1}$ and the oxygen is supplied by bubbling air into the culture medium. The stirring is carried out with a bar magnet. This step is carried out for 24 hours. The seeded perlite is then drained.

The perlite seeded with the *M. austroafricanum* I-2562 bacterium is introduced into a biofilter with a volume of 4.7 L. The mineral medium is introduced, then the biofilter is closed. The reactor containing the fixed bed (perlite) on which *M. austroafricanum* I-2562 is fixed is set to operate continuously. The supply medium is composed of the previously sterilized culture medium having the composition mentioned in Example 1 to which a solution of MTBE is added. The supply is carried out via the bottom of the reactor and, after passing through the reaction bed (immersed), the effluent is collected at the top of the reactor and is analyzed. The initial supply of MTBE ensures an input concentration of 10 $mg.L^{-1}$ and an initial residence time in the biofilter of 50 hours, this residence time then being increased to a duration of 4 days. The oxygen is supplied by the mineral medium, which is saturated with oxygen, and also by bubbling air into the biofilter (at a rate of 0.4 $L.h^{-1}$). The MTBE concentrations on entering and leaving the biofilter are measured (FIG. 1) and the degradation efficiency (% of MTBE degraded on the biofilter) as well as the elimination capacity (mg of MTBE degraded $h^1.L^{-1}$ of biofilter) of the biofilter can be calculated. The corresponding graphs are shown in FIG. 2. In FIG. 2, it can be seen that the rate of MTBE elimination by *M. austroafricanum* I-2562 fixed on perlite is 100% during the first 150 hours of continuous operation of the reactor. The MTBE concentration (FIG. 1) thus passes from 10 $mg.L^{-1}$ to a concentration below the detection threshold (100 $\mu g.L^{-1}$). The concentration in the effluent then grows but remains below 1 $mg.L^{-1}$ for more than 500 hours, which shows the strong activity of the cells of *M. austroafricanum* I-2562 fixed on this support for the elimination of the MTBE.

In the above examples, the expanded perlite was purchased from EFISOL of NANTERRE CEDEX, FRANCE and had a particle size distribution of:
  mean diameter: 2.35 mm (min 1.14-max 5.10)
  mean radius ratio: 2.01 mm (min. 1.18-max 11.26).

In general, as set forth in the Perlite Product Guide of the Perlite Institute Inc. of Harrisburg, Pa., perlite has the following typical chemical analysis:

| | |
|---|---|
| Silicon | 33.8 |
| Aluminum | 7.2 |
| Potassium | 3.5 |
| Sodium | 3.4 |
| Iron | 0.6 |
| Calcium | 0.6 |
| Magnesium | 0.2 |
| Traces | 0.2 |
| Oxygen (by difference) | 47.5 |
| Net Total | 97.0 |
| Bound Water | 3.0 |
| Total, % | 100.0 |

All the above analyses are shown in elemental form even though the actual forms present are mixed glassy silicates. Typical product characteristics of expanded perlite are:

| | |
|---|---|
| Color | White |
| G.E. Brightness, % | 80-85 |
| Refractive Index | 1.47 |
| Specific Gravity | 2.34 |
| Apparent density, | |
| lb/ft³ | 2.5-10.5 |
| kg/m³ | 40-170 |
| Water absorption | 200-600 |
| % wt. | |
| Oil Absorption, gms-oil/gm | 50-100 |
| Moisture, % | <1 |
| Ignition Loss, (1 hour at 1800° F.) | 2.0% max |
| Wet density | |
| lb/ft³ and | 5.0-20.0 |
| kg/m³ | 80-320 |
| Flowability (when damp) | Good |
| Handleability (caking resistance) | Good |
| Absorption rate | Instantaneous |
| Particle size, mesh (range) | 0-200 U.S. Standard (074-.9 mm) |
| Weight gain, % | |
| (50% R.H.-5 days) | 7.0 max |
| (90% R.H.-5 days) | 14.0 max |
| pH (water slurry) | Neutral |
| Solubility | Slightly soluble (<3%) in Mineral Acids (IN) |

\* Weight gain of perlite concentrate (perlite material being carried).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. In a process for treating an aqueous effluent containing at least one ether chosen from methyl tert–butyl ether (MTBE) and methyl tert-amyl ether (TAME) intended to reduce the concentration of said ether in said effluent, comprising growing the bacterium *Mycobacterium austroafricanum* (*M austroafricanum*)1-2562 in aerobic conditions in the presence of a growth substrate comprising said at least one ether as a source of carbon and energy, whereby said at least one ether is degraded by said bacterium to the final degradation products, carbon dioxide and water, the improvement wherein said bacterium is fixed on a support comprising at least 50% by mass of expanded perlite.

2. A process according to claim 1, wherein said support consists essentially of expanded perlite.

3. A process according to claim 1, wherein yeast extract is added to the growth substrate in proportions between 10 and 200 mg.L-1.

4. A process according to claim 1, wherein at least one nutritional additive is added to the growth substrate.

5. A process according to claim 4, wherein said additive comprises a carbon-containing source as growth substrate.

6. A process according to claim 1, wherein said aqueous effluent is an aquifer.

7. A process according to claim 6 further comprising supplying air or dioxygen to the aquifer via a piezometer linked to a compressor and implanted directly into said aquifer.

8. A process according to claim 6 further comprising supplying oxygen to the aquifer by injection of oxygenated water.

9. A process according to claim 6 further comprising supplying oxygen to the aquifer by at least one injected oxygen release compound.

10. A process according to claim 6, wherein said support consists essentially of expanded perlite.

11. A process according to claim 1, wherein said growing of the bacterium is conducted in a biobarrier.

12. A process according to claim 11, wherein the support is placed in the biobarrier or in the biofilter and the *M austroafricanum* 1-2562 bacterium is cultured in a reactor on the growth medium containing a growth substrate, which allows a large biomass to be obtained while inducing enzyme systems responsible for the degradation of MTBE nd/or TAME; then, after growth, the culture obtained is introduced onto the support.

13. A process according to claim 12, wherein said support consists essentially of expanded perlite.

14. A process according to claim 11 wherein the support and the *M austroafricanum* 1-2562 bacterium are introduced simultaneously, then the bacterium is left to grow in the presence of a growth substrate to fix the bacterium on the support at the same time as its growth.

15. A process according to claim 11, wherein said support consists essentially of expanded perlite.

16. A process according to claim 1 further comprising supplying oxygen to the effluent by injection of oxygenated water.

17. A process according to claim 1, wherein the oxygen is supplied by at least one injected oxygen release compound.

18. A process according to claim 1, wherein said growing is conducted in a biofilter.

19. A process according to claim 1, wherein said at least one ether comprises MTBE.

20. A process according to claim 1, wherein said at least one ether comprises TAME.

* * * * *

UNITED STATES PATENT AND TRADEMARK OFFICE
CERTIFICATE OF CORRECTION

| | | |
|---|---|---|
| PATENT NO. | : 7,368,278 B2 | Page 1 of 1 |
| APPLICATION NO. | : 10/858479 | |
| DATED | : May 6, 2008 | |
| INVENTOR(S) | : Darwin Lyew | |

It is certified that error appears in the above-identified patent and that said Letters Patent is hereby corrected as shown below:

On the title page, item [30] priority data reads "June 20, 2003" should read -- June 2, 2003 --
Column 8, line 58, reads "nd/or" should read -- and/or --

Signed and Sealed this

Twenty-sixth Day of August, 2008

JON W. DUDAS
*Director of the United States Patent and Trademark Office*